United States Patent [19]

Pockrandt et al.

[11] Patent Number: 5,678,027
[45] Date of Patent: Oct. 14, 1997

[54] METHOD FOR PREVENTING UNAUTHORIZED MODIFICATION OF DATA IN A DEVICE WITH A NONVOLATILE MEMORY

[75] Inventors: Wolfgang Pockrandt, Reichertshausen; Hartmut Schrenk, Haar, both of Germany

[73] Assignee: Siemens Aktiengesellschaft, Munich, Germany

[21] Appl. No.: 351,615

[22] Filed: Dec. 8, 1994

[30] Foreign Application Priority Data

Dec. 8, 1993 [DE] Germany .................. 43 41 887.2

[51] Int. Cl.⁶ ............................................ G06F 12/14
[52] U.S. Cl. ............................................ 395/490
[58] Field of Search ........................ 395/442, 490, 395/491; 380/3, 23, 25; 902/4, 28; 235/382

[56] References Cited

U.S. PATENT DOCUMENTS

| 3,742,458 | 6/1973 | Inoue et al. ............... 395/481 |
| 5,325,496 | 6/1994 | Hays et al. ................ 395/410 |
| 5,452,431 | 9/1995 | Bournas .................... 395/442 |

FOREIGN PATENT DOCUMENTS

| 0 449 255 | 10/1991 | European Pat. Off. . |
| 0 540 095 | 5/1993 | European Pat. Off. . |

OTHER PUBLICATIONS

Patents Abstract of Japan, Section No. P 1531, vol. 17, No. 228, May 11, 1993 & JP-4-357543 (Fujitsu) p. 47.
Patents Abstact of Japan, Section No. P 14, vol. 4, No. 78, Jun. 6, 1980 & JP-5542312 (Hitachi) p. 28.

*Primary Examiner*—Eddie P. Chan
*Assistant Examiner*—Kevin L. Ellis
*Attorney, Agent, or Firm*—Herbert L. Lerner; Laurence A. Greenberg

[57] ABSTRACT

A method for preventing unauthorized data modification is carried out in a device, such as a chip card, having a nonvolatile memory, a central processing unit, and a program memory assigned to the central processing unit. A command is given to set a check bit in a check register being triggerable by the central processing unit, with a program for modifying data in a memory region of the nonvolatile memory. A check is made to determine if the command derives from a defined address region of the data modification program. The command is carried out by setting the check bit in the check register, if the command derives from the defined address region. A check is made for special permission for a data modification in a memory region of the nonvolatile memory. A check is made to determine if the check bit is set, if the special permission has been given. The data in the memory region is modified if a control bit is set. The check bit in the check register is reset and the permission to write is rescinded, after an allowed data modification, or if a data modification was not allowed, or if no check bit was set.

2 Claims, 2 Drawing Sheets

METHOD FOR PREVENTING UNAUTHORIZED MODIFICATION OF DATA IN A DEVICE WITH A NONVOLATILE MEMORY

BACKGROUND OF THE INVENTION

Field of the Invention

The invention relates to a method for preventing unauthorized modification of data in a device having a nonvolatile memory, a central processing unit, and a program memory assigned to the central processing unit.

When such a device is used in a chip card, the data stored in the nonvolatile memory represent a value, often a monetary value, in many applications. The risk of unauthorized or unintentional modification of data therefore exists.

Data modifications in a nonvolatile memory, which is of the EPROM or EEPROM type in chip cards, typically result from activation of a sequence control or programming program, with which the beginning and end of the data modification is brought about, after suitable prior occupation of registers.

Problems arise, firstly from trouble in the operating conditions of the device, which can trip a parasitic data modification event, for instance during the ON phase, if the operating voltages or frequencies are not stable. Secondly, particularly in chip cards, manipulations of the programs themselves must also be dealt with.

Functions used to protect against undesired operations in a nonvolatile memory are typically achieved by providing blockades inside the user program before a memory operation is performed. The blockades are not eliminated until after a check for authorization has been made. Such blockade functions can be controlled flexibly and administered by software, using the nonvolatile memory. However, the control functions only as long as the data modification program can run undisturbed. However, if intentional or unintentional disturbances cause discontinuities in the program sequence, then erroneous data modification can no longer be precluded. A more effective way of protecting against such a risk would be to provide additional and always operative physical protection in certain address regions of the nonvolatile memory, of the kind that have successfully passed the test of time in memory cards with fixed logic. Examples thereof are fusible links for activating a barrier logic for predetermined address regions. However, a fixed blockade logic is undesirable in a standard processor chip, because in various applications it is a hindrance to flexible use.

SUMMARY OF THE INVENTION

It is accordingly an object of the invention to provide a method for preventing unauthorized data modification in a device with a nonvolatile memory, which overcomes the hereinafore-mentioned disadvantages of the heretofore-known devices of this general type, in which the flexibility of a software version is attained on one hand, and the functional reliability of a hardware version is virtually attained on the other hand.

With the foregoing and other objects in view there is provided, in accordance with the invention, in a method for preventing unauthorized data modification in a device, such as a chip card, having a nonvolatile memory, a central processing unit, and a program memory assigned to the central processing unit, the improvement which comprises giving a command to set a check bit in a check register being triggerable by the central processing unit, with a program for modifying data in a memory region of the nonvolatile memory; checking if the command derives from a defined address region of the data modification program; carrying out the command by setting the check bit in the check register, if the command derives from the defined address region; checking for special permission for a data modification in a memory region of the nonvolatile memory; checking if the check bit is set, if the special permission has been given; modifying the data in the memory region, if a control bit is set; and resetting the check bit in the check register and rescinding the permission to write, after an allowed data modification, and if a data modification was not allowed, and if no check bit was set.

In a method according to the invention, a check bit is set in a check register before performing a check for permission to make a data modification in a memory region of the nonvolatile memory, which can be done, for instance, by polling a secret number. After permission has been checked and before the data modification itself, a check is then made as to whether or not the check bit has been set. An unintended or unauthorized intervention into the data modification program taking place only after the check for permission can accordingly not lead to any data modification, since the check bit is not set. However, if the check bit is set by an intervention into the data modification program then the ensuing check for permission must also be carried out. There is accordingly very high security against data modification from an erroneous intervention into the data modification program, since the setting of the check bit creates a hardware barrier.

Since the check bit cannot be set in an arbitrary way to enable an intervention into the data modification program after the check for permission, the commands which are necessary to set the check bit must be located in a defined address region of the data modification program and, before setting the check bit, the check register must check whether or not the commands for setting it do come from that defined address region. Other features which are considered as characteristic for the invention are set forth in the appended claims.

Although the invention is illustrated and described herein as embodied in a method for preventing unauthorized modification of data in a device with a nonvolatile memory, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
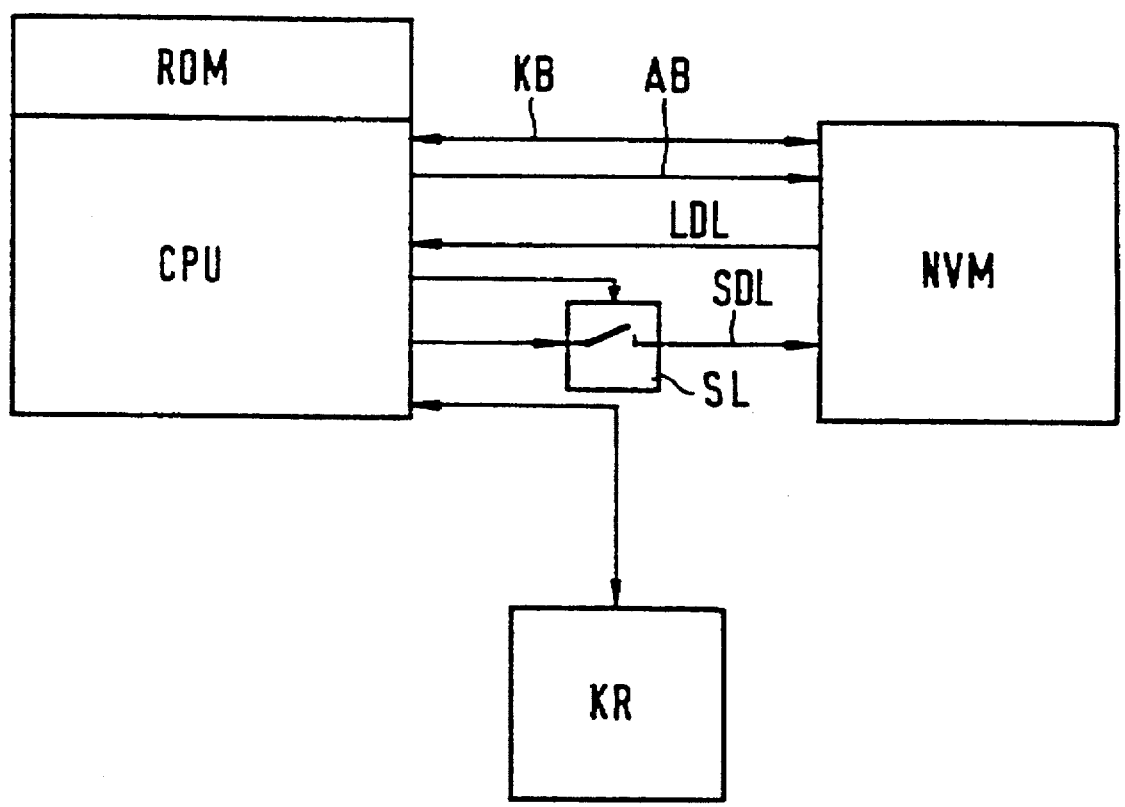
FIG. 1 is a basic block circuit diagram of a device for performing the method of the invention.

Referring now to the figures of the drawing in detail and first, particularly, to FIG. 1 thereof, there is seen a basic circuit diagram which shows a central processing unit CPU, to which a program memory ROM is assigned. The central processing unit CPU triggers a nonvolatile memory NVM through a control bus KB and an address bus AB. Data from the nonvolatile memory NVM can be read by the central processing unit CPU through a read data line LDL. However, data can be transferred to the nonvolatile memory NVM only by means of a write data line SDL, through a barrier logic circuit SL which is triggerable by the central processing unit CPU. The activation of the barrier logic circuit SL takes place as a function of the status of a check register KR connected to the central processing unit CPU.

Figure 2:
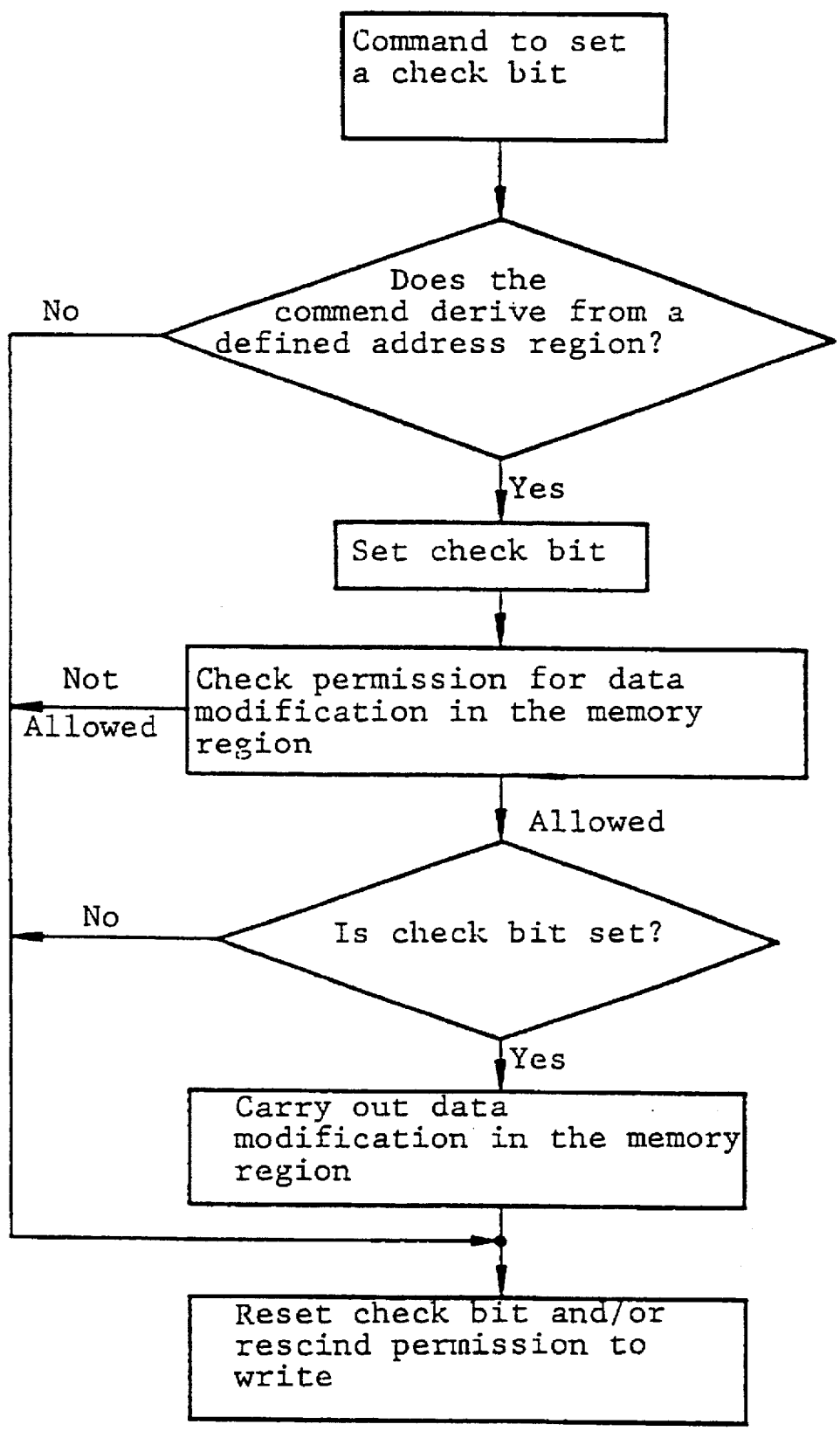
FIG. 2 is a flowchart of the method of the invention.

FIG. 2 shows the course of a data modification in a memory region of the nonvolatile memory. First, a check bit is set in the check register in the central processing unit. In the process, before setting the check bit, the check register checks whether or not the setting command comes from a defined address region of the data modification program. Accordingly, before the setting command is carried out, the authorization for giving a command is checked. Then a check of the permission for a data modification in a memory region of the nonvolatile memory takes place. If the data modification is not allowed, then the check bit is reset and the process is ended. However, if the data modification is allowed, then a check is made as to whether or not a check bit is set. It is only when this check has a positive outcome that data can be modified in a conventional way in the nonvolatile memory by the central processing unit. If the check bit is not set, then the data modification permission is rescinded and the method is ended.

We claim:

1. In a method for preventing unauthorized data modification in a device having a nonvolatile memory, a central processing unit, and a program memory assigned to the central processing unit, the improvement which comprises:

executing a program for modifying data in a memory region of the nonvolatile memory, which program includes a command to set a check bit in a check register wherein the check register is triggerable by the, central processing unit;

checking if the command derives from a defined address region of the data modification program;

carrying out the command by setting the check bit in the check register, if the command derives from the defined address region;

checking for special permission for a data modification, the data modification to be effected in a memory region of the nonvolatile memory;

checking if the check bit is set, if the special permission has been given;

modifying the data in the memory region, if a check bit is set; and ;

subsequently resetting the check bit in the check register and rescinding the permission for the data modification, and also giving a command to reset the check bit in the check register and to rescind the permission for the data modification if the permission for the data modification had not been given, and if no check bit had been set.

2. In a method for preventing unauthorized data modification in a chip card having a nonvolatile memory, a central processing unit, and a program memory assigned to the central processing unit, the improvement which comprises:

executing a program for modifying data in a memory, region of the nonvolatile memory, which program includes a command to set a check bit in a check register, wherein the check register is triggerable by the central processing unit;

checking if the command derives from a defined address region of the data modification program;

carrying out the command by setting the check bit in the check register, if the command derives from the defined address region;

checking for special permission for a data modification, the data modification to be effected in a memory region the nonvolatile memory;

checking if the check bit is set, if the special permission has been given;

modifying the data in the memory region, if the check bit is set; and subsequently resetting the check bit in the check register and rescinding the permission for the data modification, and also giving a command to reset the check bit in the check register and to rescind the permission for the data modification if the permission for the data modification had not been given, and if no check bit had been set.

* * * * *